(12) United States Patent
Biglari et al.

(10) Patent No.: US 9,907,319 B2
(45) Date of Patent: Mar. 6, 2018

(54) DUAL-AXIS ROTATIONAL MIXER FOR FOOD PRODUCTS

(71) Applicant: Steak 'n Shake Enterprises, Inc., Indianapolis, IN (US)

(72) Inventors: Sardar Biglari, San Antonio, TX (US); David Milton, Garner, NC (US)

(73) Assignee: Steak 'n Shake Enterprises, Inc., Indianapolis, IN (US)

( * ) Notice: Subject to any disclaimer, the term of this patent is extended or adjusted under 35 U.S.C. 154(b) by 75 days.

(21) Appl. No.: 14/657,077

(22) Filed: Mar. 13, 2015

(65) Prior Publication Data
US 2016/0262421 A1 Sep. 15, 2016

(51) Int. Cl.
| | | |
|---|---|---|
| *B01F 9/00* | (2006.01) | |
| *B01F 15/06* | (2006.01) | |
| *A23G 9/22* | (2006.01) | |
| *A23G 9/08* | (2006.01) | |
| *G05B 15/02* | (2006.01) | |

(Continued)

(52) U.S. Cl.
CPC .............. *A23G 9/224* (2013.01); *A23G 9/08* (2013.01); *A23G 9/086* (2013.01); *A23G 9/106* (2013.01); *A23G 9/22* (2013.01); *B01F 9/0001* (2013.01); *B01F 15/00746* (2013.01); *B01F 15/00896* (2013.01); *G05B 15/02* (2013.01); *A23V 2002/00* (2013.01)

(58) Field of Classification Search
CPC ........ A23G 9/224; A23G 9/086; A23G 9/106; A23G 9/22; A23G 9/08; B01F 15/00896; B01F 15/00746; B01F 9/0001; G05B 15/02; A23V 2002/00

USPC .......................................................... 366/217
See application file for complete search history.

(56) References Cited

U.S. PATENT DOCUMENTS

| 3,706,443 | A | | 12/1972 | Oberhauser | |
|---|---|---|---|---|---|
| 3,778,033 | A | * | 12/1973 | Pullman | ................ B01F 9/0001 366/219 |
| 3,941,357 | A | | 3/1976 | Wurtz | |

(Continued)

FOREIGN PATENT DOCUMENTS

| CN | 102883622 | 1/2013 |
|---|---|---|
| EP | 0945170 | 3/1999 |

(Continued)

OTHER PUBLICATIONS

Machine translation of JP 03193127 A.*

(Continued)

*Primary Examiner* — Charles Cooley
(74) *Attorney, Agent, or Firm* — Parker Ibrahim & Berg LLC; James M. Behmke; Stephen D. LeBarron

(57) ABSTRACT

A dual-axis mixer for food products includes a product holder that is configured to hold a sealed product cup containing a food product to be mixed. The mixer has a primary axis of rotation about a central axis, and a secondary axis of rotation radially offset from the central axis. In doing so, the secondary axis positioned to rotate around the primary axis. Furthermore, the product holder is located at the secondary axis and is configured to rotate about the secondary axis. Rotation about the primary axis applies centripetal force to the food product, and the secondary axis rotates the product holder to churn the food product within the product cup.

15 Claims, 18 Drawing Sheets

(51) Int. Cl.
*A23G 9/10* (2006.01)
*B01F 15/00* (2006.01)

(56) References Cited

U.S. PATENT DOCUMENTS

| | | | | |
|---|---|---|---|---|
| 4,497,581 | A * | 2/1985 | Miller | B01F 9/0001 366/208 |
| 4,523,855 | A | 6/1985 | Walker | |
| 4,586,292 | A * | 5/1986 | Carroll | B24B 11/00 366/219 |
| 4,697,929 | A | 10/1987 | Muller | |
| 4,728,197 | A * | 3/1988 | Reinhard | A61O 5/064 366/219 |
| 4,737,372 | A | 4/1988 | Bender | |
| 5,102,229 | A | 4/1992 | Wada et al. | |
| 5,150,967 | A | 9/1992 | Neilson et al. | |
| 5,167,448 | A * | 12/1992 | Herold | B01F 15/0205 366/213 |
| 5,302,020 | A | 4/1994 | Kruse | |
| 5,352,037 | A * | 10/1994 | Jouvin | B01F 9/0001 366/219 |
| 5,507,575 | A | 4/1996 | Rossetti | |
| 5,547,275 | A | 8/1996 | Lillelund et al. | |
| 5,551,779 | A * | 9/1996 | Gantner | B01F 9/0001 366/217 |
| 5,653,157 | A | 8/1997 | Miller | |
| 5,746,510 | A * | 5/1998 | Mark | B01F 9/0001 366/217 |
| 5,803,377 | A | 9/1998 | Farrell | |
| 5,868,065 | A | 2/1999 | Haggerty et al. | |
| 5,884,999 | A | 3/1999 | Muzzio et al. | |
| 5,962,060 | A | 10/1999 | Farrell | |
| 6,041,961 | A | 3/2000 | Farrell | |
| 6,099,160 | A * | 8/2000 | Flackett | B01F 11/0008 366/217 |
| 6,326,047 | B1 | 12/2001 | Farrell | |
| 6,421,583 | B1 | 7/2002 | Sudolcan et al. | |
| 6,465,034 | B2 | 10/2002 | Farrell | |
| 6,474,862 | B2 | 11/2002 | Farrell | |
| 6,527,207 | B1 | 3/2003 | Farrell et al. | |
| 6,755,565 | B2 | 6/2004 | Flackett | |
| 6,945,689 | B2 * | 9/2005 | Armendariz | B01F 11/0008 366/209 |
| 6,945,690 | B2 * | 9/2005 | Armendariz | B01F 15/0074 366/209 |
| 7,036,334 | B2 | 5/2006 | Ko et al. | |
| 7,059,763 | B2 | 6/2006 | Sordelli et al. | |
| 7,144,150 | B2 | 12/2006 | Farrell | |
| 7,325,969 | B2 | 2/2008 | Kretzschmar et al. | |
| 7,448,546 | B2 | 11/2008 | Jung et al. | |
| 7,520,658 | B2 | 4/2009 | Farrell | |
| 7,520,662 | B2 | 4/2009 | Farrell | |
| 7,604,392 | B2 | 10/2009 | Brezinsky et al. | |
| 7,726,136 | B2 | 6/2010 | Baxter et al. | |
| 7,806,294 | B2 | 10/2010 | Gatipon et al. | |
| 7,890,213 | B2 | 2/2011 | Greco et al. | |
| 7,908,871 | B2 | 3/2011 | Baxter et al. | |
| 8,092,075 | B2 * | 1/2012 | Ishii | B01D 19/0052 366/139 |
| 8,151,577 | B2 | 4/2012 | Bucceri | |
| 8,336,731 | B2 | 12/2012 | Farrell et al. | |
| 8,459,043 | B2 | 6/2013 | Bertone | |
| 8,651,730 | B2 | 2/2014 | Barbi | |
| 9,724,657 | B2 * | 8/2017 | Hoffman | B01F 9/0003 |
| 2002/0172091 | A1 | 11/2002 | Hatakeyama | A47J 19/027 366/144 |
| 2003/0046377 | A1 | 3/2003 | Daum et al. | |
| 2003/0198126 | A1 * | 10/2003 | Flackett | B01F 9/0032 366/217 |
| 2005/0193896 | A1 | 9/2005 | McGill | |
| 2005/0282104 | A1 * | 12/2005 | Suzuki | B01F 11/0005 433/49 |
| 2007/0002680 | A1 * | 1/2007 | Vanderbilt | B01F 9/0001 366/217 |
| 2007/0002681 | A1 * | 1/2007 | Vanderbilt | B01D 19/0052 366/217 |
| 2007/0002682 | A1 * | 1/2007 | Vanderbilt | B01F 3/12 366/217 |
| 2007/0025180 | A1 * | 2/2007 | Ishii | B01D 19/0052 366/139 |
| 2008/0087352 | A1 * | 4/2008 | Malanowicz | B01F 9/0001 141/2 |
| 2008/0192564 | A1 * | 8/2008 | Jouvin | A61K 6/10 366/7 |
| 2008/0279040 | A1 | 11/2008 | Neilson et al. | |
| 2009/0083000 | A1 | 3/2009 | Sherman et al. | |
| 2009/0120306 | A1 | 5/2009 | DeCarlo et al. | |
| 2009/0193823 | A1 | 8/2009 | Lee et al. | |
| 2010/0239723 | A1 | 9/2010 | Pendergast et al. | |
| 2011/0013477 | A1 | 1/2011 | Kozlowski et al. | |
| 2011/0013479 | A1 | 1/2011 | Chaudhuri et al. | |
| 2011/0020508 | A1 | 1/2011 | Santoiemmo | |
| 2011/0088558 | A1 | 4/2011 | Farrell et al. | |
| 2011/0088568 | A1 | 4/2011 | Farrell et al. | |
| 2011/0090756 | A1 | 4/2011 | Farrell et al. | |
| 2011/0239868 | A1 | 10/2011 | Farrell et al. | |
| 2012/0128834 | A1 | 5/2012 | Westdijk et al. | |
| 2012/0135846 | A1 * | 5/2012 | Yao | B01F 9/0001 494/13 |
| 2013/0280385 | A1 | 10/2013 | Arns et al. | |
| 2013/0284029 | A1 | 10/2013 | Reed et al. | |
| 2013/0341439 | A1 | 12/2013 | Farrell et al. | |
| 2013/0341446 | A1 | 12/2013 | Farrell et al. | |
| 2013/0343150 | A1 | 12/2013 | Farrell et al. | |
| 2013/0344220 | A1 | 12/2013 | Farrell et al. | |
| 2013/0344221 | A1 | 12/2013 | Farrell et al. | |
| 2014/0161946 | A1 | 6/2014 | Torricelli et al. | |
| 2014/0188271 | A1 | 7/2014 | Hernandez et al. | |
| 2014/0199445 | A1 | 7/2014 | Torricelli et al. | |
| 2014/0293729 | A1 | 10/2014 | Ni et al. | |
| 2014/0295044 | A1 | 10/2014 | Cocchi et al. | |
| 2015/0110735 | A1 * | 4/2015 | Hoffman | B01F 9/0001 424/85.2 |
| 2015/0174539 | A1 * | 6/2015 | Eberle | B01F 9/0001 366/218 |
| 2016/0262421 | A1 * | 9/2016 | Biglari | A23G 9/224 |
| 2016/0262422 | A1 * | 9/2016 | Biglari | A23G 9/224 |

FOREIGN PATENT DOCUMENTS

| | | | |
|---|---|---|---|
| EP | 1279359 | | 12/2009 |
| EP | 2413118 A1 | | 2/2012 |
| JP | 03193127 A | * | 8/1991 |
| JP | 09220459 A | * | 8/1997 |
| JP | 10043567 A | * | 2/1998 |
| JP | 4084493 B2 | * | 2/2008 |
| JP | 2008114136 A | * | 5/2008 |
| JP | 2009208026 A | * | 9/2009 |
| JP | 2011045873 A | * | 3/2011 |
| WO | WO-1993005345 | | 3/1993 |
| WO | WO-99/21466 A1 | | 5/1999 |
| WO | WO 9921466 A1 | * | 5/1999 ... A47J 43/042 |
| WO | WO-2006082214 | | 8/2006 |
| WO | WO-2010064042 | | 6/2010 |
| WO | WO-2011/008234 A1 | | 1/2011 |
| WO | WO-2012/122594 A1 | | 9/2012 |
| WO | WO-2013090768 | | 6/2013 |

OTHER PUBLICATIONS

Machine translation of JP 09220459 A.*
Machine translation of JP 2008114136 A.*
Machine translation of JP 2009208026 A.*
Machine translation of JP 2011045873 A.*
International Search Report dated May 18, 2016 in connection with PCT/US2016/021907.

* cited by examiner

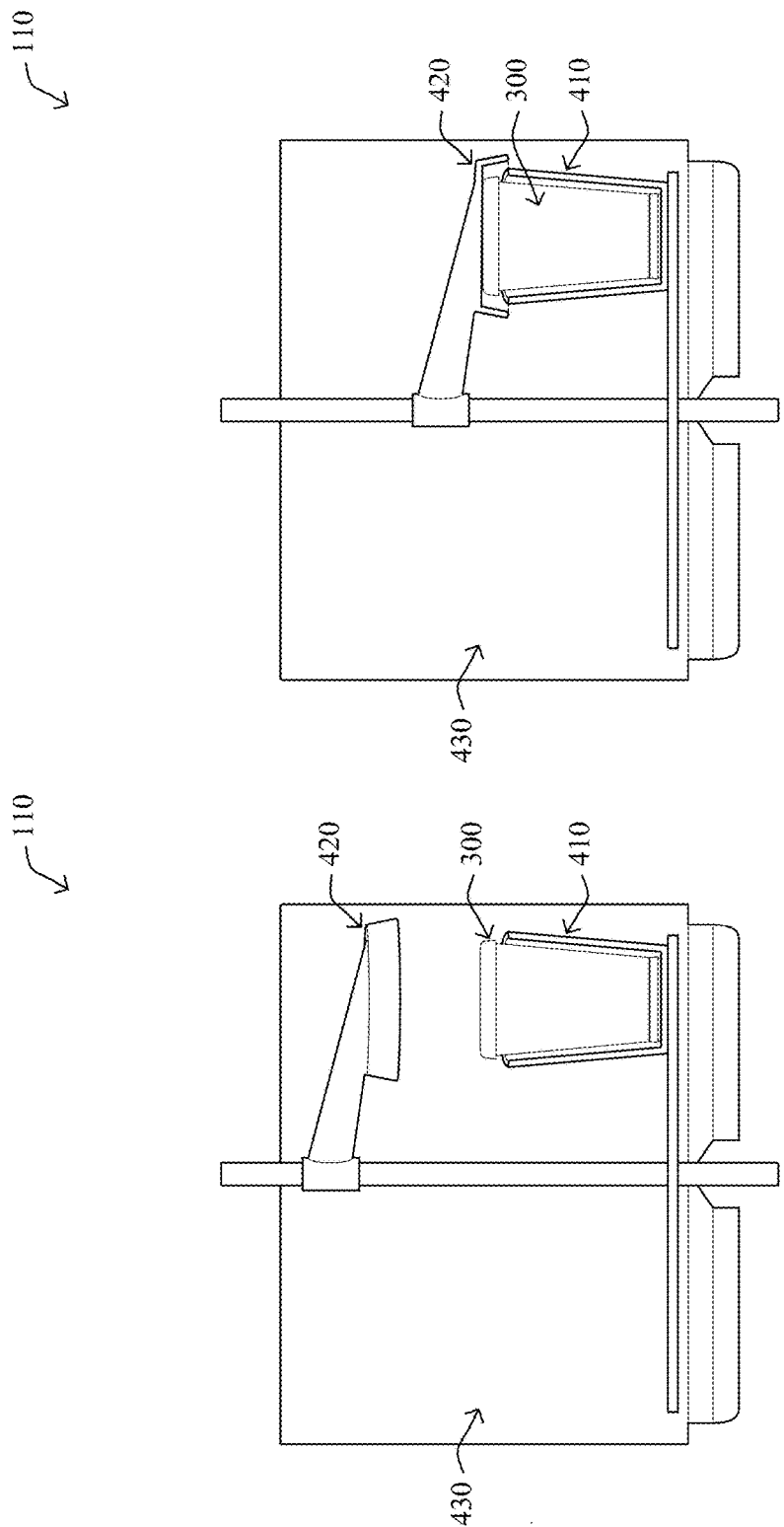

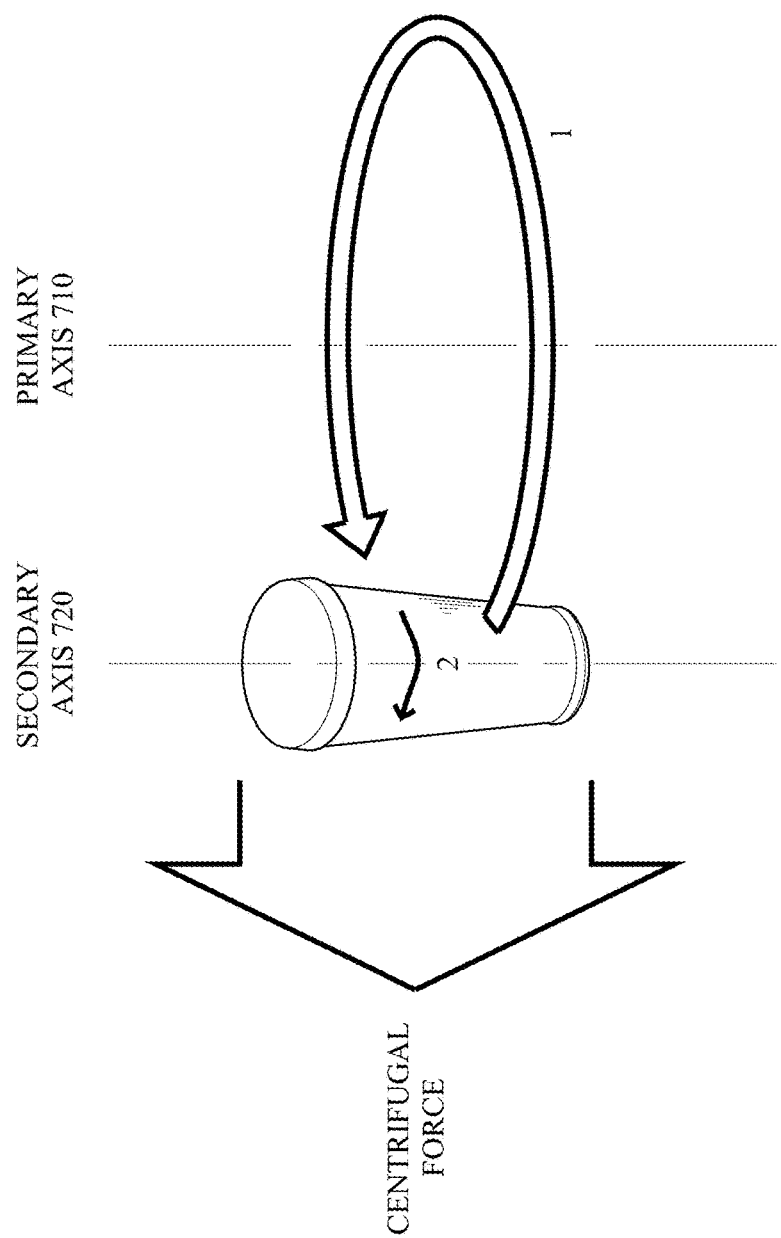

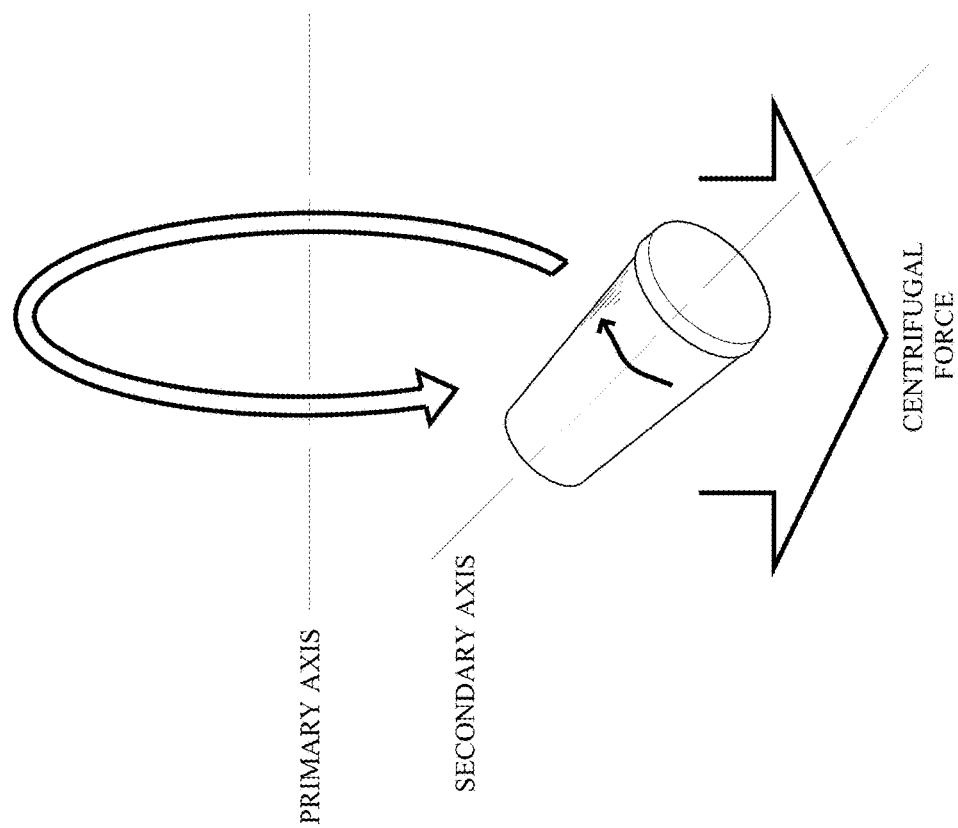

DUAL-AXIS ROTATIONAL MIXER FOR FOOD PRODUCTS

TECHNICAL FIELD

The present disclosure relates generally to food product mixing, and, more particularly, to a dual-axis rotational mixer for food products.

BACKGROUND

The preparation of many different food and beverage products has evolved greatly over time. For instance, in addition to formulaic and/or recipe changes, many different types of machines, appliances, and processes have been created, allowing for simplified production, automated production, mass production and/or distribution, and so on. While certain of these changes have occurred at food or beverage processing plants, many improvements have also been presented in the area of food and beverage services, such as for restaurants, convenience stores, and home use.

Milkshakes, malts, and other ice cream mixtures are one such area where improved machines and/or processes have been offered in an effort to provide a consumer with an optimal product for consumption. For example, since consistency is a major factor in milkshake enjoyment, many advances have been made regarding their blending, whipping, stirring, etc., where typically, a rotary blade or mixer is either lowered into a container holding the consumable content, or else the container is advanced towards the rotary blade/mixer to move the container's contents into contact with the blade/mixer.

When implemented at a restaurant (e.g., an ice cream shop), a server generally takes an order from a customer, inserts the appropriate contents into the container (e.g., ice cream, candies, flavor syrups, etc.), and then mixes the product to the desired consistency using an associated mixing/blending machine. Prior to mixing another product with different ingredients, the machine's components (e.g., blades/mixers/etc.) should then be cleaned by the server in order to avoid cross-contamination between orders, and to remain a generally clean food-service environment.

More recent technological advances have allowed for a milkshake or other frozen drink to be made quickly from a block of ingredients pre-frozen into a serving cup. For instance, a consumer may now choose the type or flavor to be prepared, and inserts the pre-packaged container into an automated machine, which automatically insert the blades/mixers into the container, and mixes/blends the contents to provide the finished product, e.g. the blended milkshake, at the desired consistency, to the consumer. In some machines, various ingredients may also be added to the mixture during the mixing/blending, such as milk, water, syrups, candies, etc. These types of machines thus minimize or eliminate the requirement of a specialized server, and certain of these machines also have provisions for automating the cleaning of the blades/mixers and various splash shields that are in place to protect the user and surrounding environment from contents that spill from the containers during use.

SUMMARY

The one or more embodiments of the present invention described herein advance the production of foods and beverages ("food products" herein), particularly for milkshakes, malts, or other ice cream beverages, beyond the current technologies described above.

In particular, in one embodiment, a dual-axis mixer for food products comprises a product holder that is configured to hold a sealed product cup containing a food product to be mixed. The mixer also comprises a primary axis of rotation about a central axis, and a secondary axis of rotation radially offset from the central axis, the secondary axis positioned to rotate around the primary axis. According to the illustrative embodiment, the product holder is located at the secondary axis and is configured to rotate about the secondary axis, the primary axis of rotation provides centripetal force to the food product as it rotates around the primary axis, and the secondary axis rotates the product holder to churn the food product within the product cup.

Other specific embodiments and implementations are described in greater detail below, and this brief summary is not meant to be limiting to the scope of protection of the invention described herein.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A and 4B illustrate example cutaway views of the mixer for food products of FIG. 1 (open and closed position) in accordance with one or more embodiments herein;

FIG. 7 illustrates an example of dual-axis mixing in accordance with one or more embodiments herein;

FIGS. 15A and 15B illustrate examples of alternative orientations of a dual-axis food product mixer in accordance with one or more embodiments herein.

DETAILED DESCRIPTION OF EXAMPLE EMBODIMENTS

As noted above, milkshakes, malts, and other ice cream mixtures are one such area where improved machines and/or processes have been offered in an effort to provide a consumer with an optimal product for consumption. Current systems, however, suffer from one or more inefficiencies. For example, cleanliness is a major concern for food preparation, both in terms of sanitary conditions as well as for cross-contamination of products. Though many systems are in place currently that provide for automated cleaning (e.g., water sprayers, wash-downs, etc.), such systems are generally meant to mitigate the inevitable spillage from the associated food product preparation process. Other systems in use today may attempt to reduce the amount of overall cleanup required, such as by covering the food container into which the blades/mixers are to be inserted prior to the mixing/blending, but such systems only reduce the amount of spillage outside of the food container during the preparation, and still require cleaning of the blades/mixers after each use.

Furthermore, as noted above, the consistency of such semi-frozen food products is an important factor in consumer enjoyment. Achieving the desired consistency has been limited to the use of blades, mixers, paddles, or other objects being inserted into and moved within the food product, such as by stirring, blending, agitating, pulverizing, etc. In certain systems currently in use in the art, the blending object may be integrated within the food container, where a rotating motor contacts with an engaging member of the container in order to correspondingly rotate the blending mechanism within the container (e.g., much like a household blender operation). Such systems, however, come at an increased container expense and complexity, and leave the blending mechanism inside the container during consumer consumption of the product.

Figure 1:
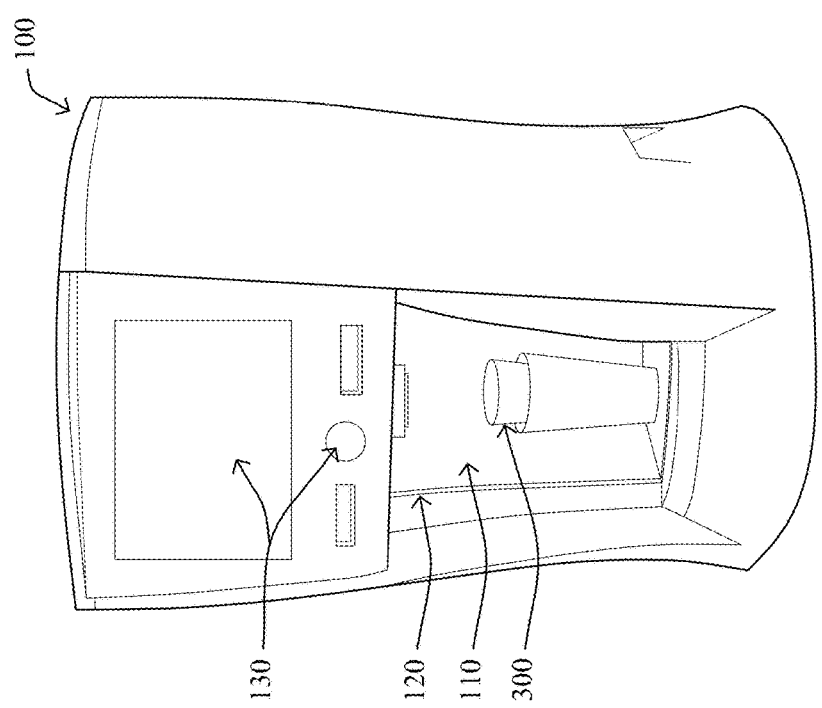
FIG. 1 illustrates an example mixer for food products in accordance with one or more embodiments herein.

FIG. 1 illustrates an example mixer for food products in accordance with one or more embodiments herein. Illustratively, mixer 100 may be used according to the techniques herein to "mix" a food product, which may also be referred to as shaking, bending, agitating, and so on. Specifically, the mixer 100 is generally intended to provide a method and apparatus to mix a food product (e.g., mostly frozen) without opening a sealed product cup 300 (shown below in FIGS. 3A and 3B). For example, milkshakes, malts, or other ice cream products are typically a thick, viscous fluid, which may require fluidizing prior to consumer consumption. Contrary to current technologies, however, the mixer 100 is able to mix such a food product and create the desired consistency without the problems associated with mixing blades, agitators, paddles, etc. being inserted into the food product, such as those mentioned above (e.g., cleanliness, sanitary considerations, service requirements, etc.).

As described in greater detail below, the mixer 100 uses increased force created by controlled movement of the product cup 300 in order to mix the food product. Specifically, through internal mixing completely inside of a sealed product cup 300, the mixer 100 operates in a manner that can take a heterogeneous solid, semi-solid, or liquid food product, whether frozen, semi-frozen, or un-frozen, and turn it into a generally homogenous consumable food product (e.g., a milkshake).

Illustratively, the example food product mixer 100 may comprise a mixing chamber 110 into which the food product cup 300 may be placed, and a protective door 120 that may be manually or automatically controlled to open and close (e.g., in either implementation with one or more sensors to ensure that the door is closed prior to operation of the mixer 100). Note that while the door 120 is shown opening and closing in a side-to-side manner, any other suitable opening/closing motion (e.g., up-and-down motion) are suitable for use with the embodiments herein. The food product mixer 100 may also comprise one or more user interface features 130, such as various control buttons, touch screen displays, wireless interfaces (e.g., for smartphone access, maintenance, etc.) and so on.

Figure 2:
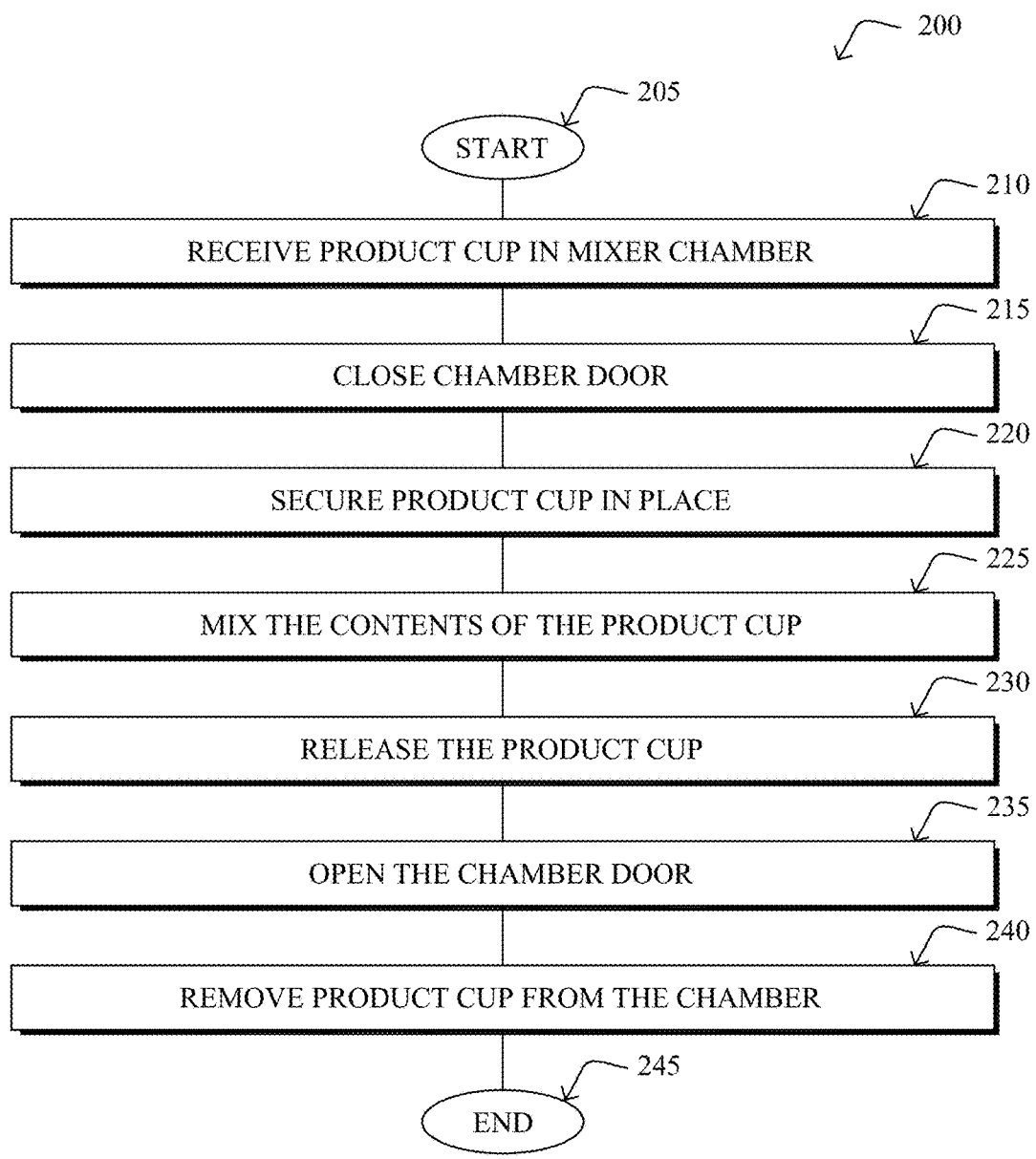
FIG. 2 illustrates an example simplified procedure for mixing food products in accordance with one or more embodiments herein.

In general, the food product mixer 100 may be designed for direct and straightforward use by the consumer, such as for self-serve stations at restaurants, convenience stores, homes, cafeterias, hotels, fairs, college campuses, etc. FIG. 2 illustrates an example simplified procedure for food product mixing in accordance with one or more embodiments described herein using the mixer 100 above. The simplified procedure 200 may start at step 205, and continues to step 210, where the mixer 100 receives a product cup 300 in chamber 110, and the door 120 is closed in step 215. In step 220 the product cup 300 may be secured in place, and then the mixer 100 mixes the contents of the product cup in step 225. The product cup may then be released in step 230, the door opens in step 235, and the product cup may then be removed from the chamber in step 240. The procedure 200 is then complete in step 245, allowing the consumer to enjoy the prepared food product.

An important aspect of the mixer 100 and procedure 200 above is to provide a simplified end-user experience of the mixer 100, that is repeatable without servicing the mixer (e.g., manual or automated cleaning). That is, the product cup 300 can be selected directly from a product placement display (e.g., a freezer/refrigerator), placed into the mixer 100, and mixed. This efficient process generally requires no user intervention to create the desired mixture (e.g., no added ingredients), no user intervention to properly mix the product (e.g., moving the cup 300 around to ensure adequate mixing), and no per-use cleanup (except in the case of an accidental product cup breach). Note, however, that although the simplified design of the example mixer 100 is important, both in terms of the user interface and the overall ease-of-operation, such simplification is not necessary to the internal workings and functionality of the mixer as described below, and the scope of the present invention is not intended to be limited to the example implementation shown in FIG. 1.

According to the illustrative techniques herein, the user operation of the mixer 100 may be as simple as inserting the product cup 300 into the chamber 110, and pressing a single "start" button (user interface component 130), such that the mixer 100 may perform the remainder of the mixing operation autonomously (e.g., closing the door 120, securing the cup, mixing, etc.). In one embodiment, this type of "insert and mix" operation assumes the same mixing parameters for all food products to be mixed the same way. Alternatively or in addition, the mixer 100 may also be configured to change various aspects of the mixing procedure, for example, various mixing parameters such as duration, speed, etc. (described below). These adjustments may be requested by the user (e.g., entering preferences through user interface 130), or else they may be adjusted automatically by the mixer 100 based on a determination (e.g., user selection and/or sensing) of various product-specific characterizations.

Figure 3B:
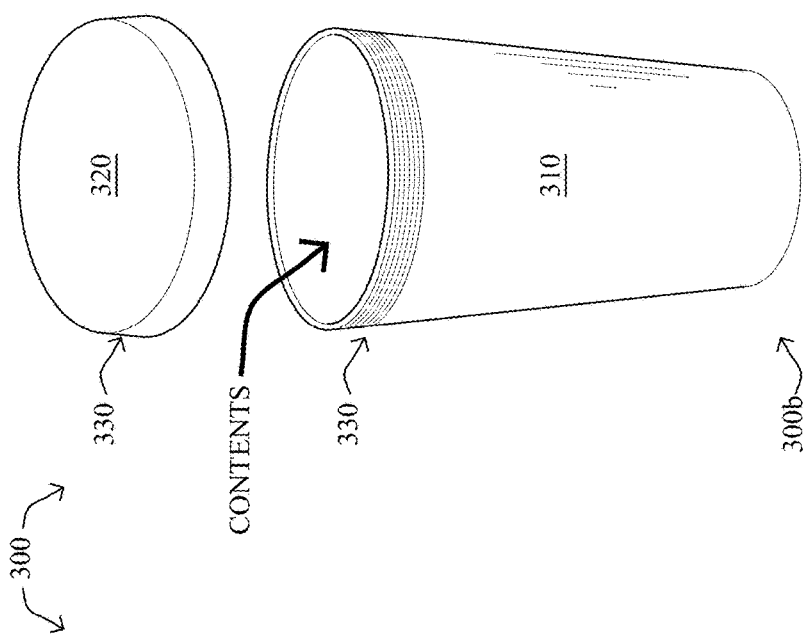
FIGS. 3A and 3B illustrate examples of sealed cups (sealed and sealable) for use with a mixer for food products in accordance with one or more embodiments herein.
Figure 3A:
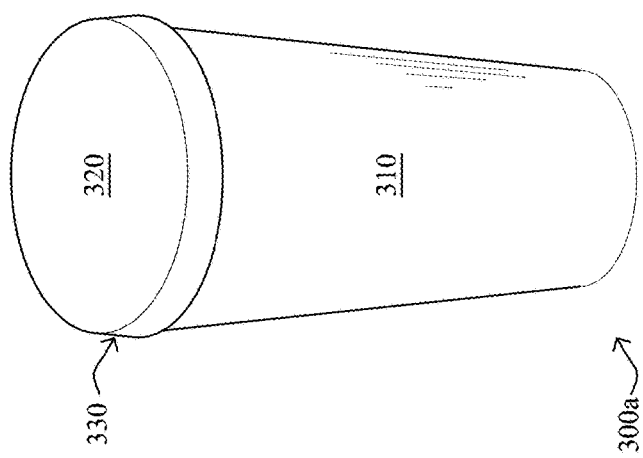

As mentioned above, another important aspect of the mixer 100 is its cleanliness, and this is illustratively accomplished in one or more ways. First, by allowing the product cup 300 to remain completely sealed throughout the mixing process, there are no components of the mixer 100 that are purposefully contacting the food product within the cup 300, such as blades, paddles, agitators, etc. FIGS. 3A and 3B, for instance, illustrate examples of sealed cups for use with a mixer for food products in accordance with one or more embodiments herein. FIG. 3A, in particular, shows a simplified product cup 300 (300*a*, specifically) that comes sealed from the factory, with a base 310, a top or cap 320, and a seal 330, which may or may not be the same point of access for consumer access to the contained product. In addition, an alternative embodiment allows for a sealable arrangement, shown in FIG. 3B, where a user (e.g., consumer, server, etc.) can prepare custom ingredients inside the base 310 of the product cup 300 (300*b*, specifically), and then can create the seal 330 by screwing on the top or cap 320 (or other securing mechanism/technique). (Note that cup 300*b* of FIG. 3B may also come pre-filled from the factory, where the consumer access is unscrewing the top or cap 320.)

As stated previously, the sealed cup 300 need not be opened during the mixing, and preferably (where pre-filled by the factory) need not be opened prior to the mixing, either. That is, by supplying pre-made, single-serve product cups 300 with the desired food product contents (e.g., milkshake ingredients), no mixes need to be added, no contamination need occur, and no mess needs to be created inside with mixer 100. For example, if a consumer wishes to have a vanilla shake, he or she simply picks the product cup 300 containing the vanilla shake, places it into the mixer 100, starts the mixer, and removes the product cup to enjoy the vanilla shake. Conversely, if another consumer then wishes to have a cookies and cream shake, he or she simply picks the product cup 300 containing the cookies and cream shake, places it into the mixer 100, starts the mixer, and removes the product cup to enjoy the cookies and cream shake. No cleaning need take place, no additives need be supplied, and no time is wasted. (Notably, after the product is mixed, the consumer can certainly open the cup 300 and add his or her own ingredients to the mixed food product.)

To protect against accidental breach of the product cup 300, as well as other sources of potential contamination of the mixer's mixing chamber 110 (e.g., external cup contamination and/or condensation), an addition layer of protection may be afforded by one or more embodiments herein. In particular, a cup holder and cup cover may surround the product cup 300, thus providing a "double seal" with the product cup's seal 330. FIGS. 4A and 4B illustrate example cutaway views of the mixer for food products of FIG. 1 (open and closed position) in accordance with one or more embodiments herein, where a cup holder 410 is meant to receive the cup 300 (when open as in FIG. 4A), and a cup cover (or lid) 420 clamps down onto the cup holder 410 (as shown in FIG. 4B), creating the secondary seal, so if the product were to breach the sides of cup 300 (or other contaminates were on the outside of the cup), the vast majority of the mixing chamber 110 stays clean. The secondary seal is illustratively a compression-type seal (e.g., a rubber gasket compressed between the holder 410 and cover 420), though other types of seals are possible, such as overlapping components, screw threads, etc.

Notably, in one embodiment the cup cover 420 lifts directly away from the cup holder 410 (e.g., straight up and down) with enough clearance to allow insertion of the product cup 300 into the cup holder. In another embodiment, the cup cover 420 may additionally or alternatively be moved (e.g., twisted, rotated, pivoted, hinged, etc.) out of the way to allow access for the product cup 300.

Note further that although one particular "coverage ratio" of the cup holder 410 to the cup cover 420 is shown, i.e., how much of the product cup 300 is contained within the holder 410 versus the cover 420, any suitable ratio may be used. For example, the ratio may range all the way from 0-100% for either the holder 410 or the cover 420, such as ranging from a simple base upon which the product cup 300 rests (such that the cover contains 100% of the product cup) to a completely encompassing cup holder (such that the cover merely closes off the top of the holder). Also, other shapes or configurations of the cover 420 and the holder 410 are possible, and the view illustrated is merely an illustrative example.

As an additional measure for cleanliness, the illustrative mixer 100 may also comprise a cleaning basin 430 that essentially forms the mixing chamber 110, surrounding the internal mixing mechanisms. In a preferred embodiment, the door 120 may be located inside of this cleaning basin 430, though the door may also be located outside of the basin. With this cleaning basin 430, any drips or spills may be contained and easily cleaned without contaminating other components of the mixer 100 (e.g., motors, electronics, etc.).

Figure 5:
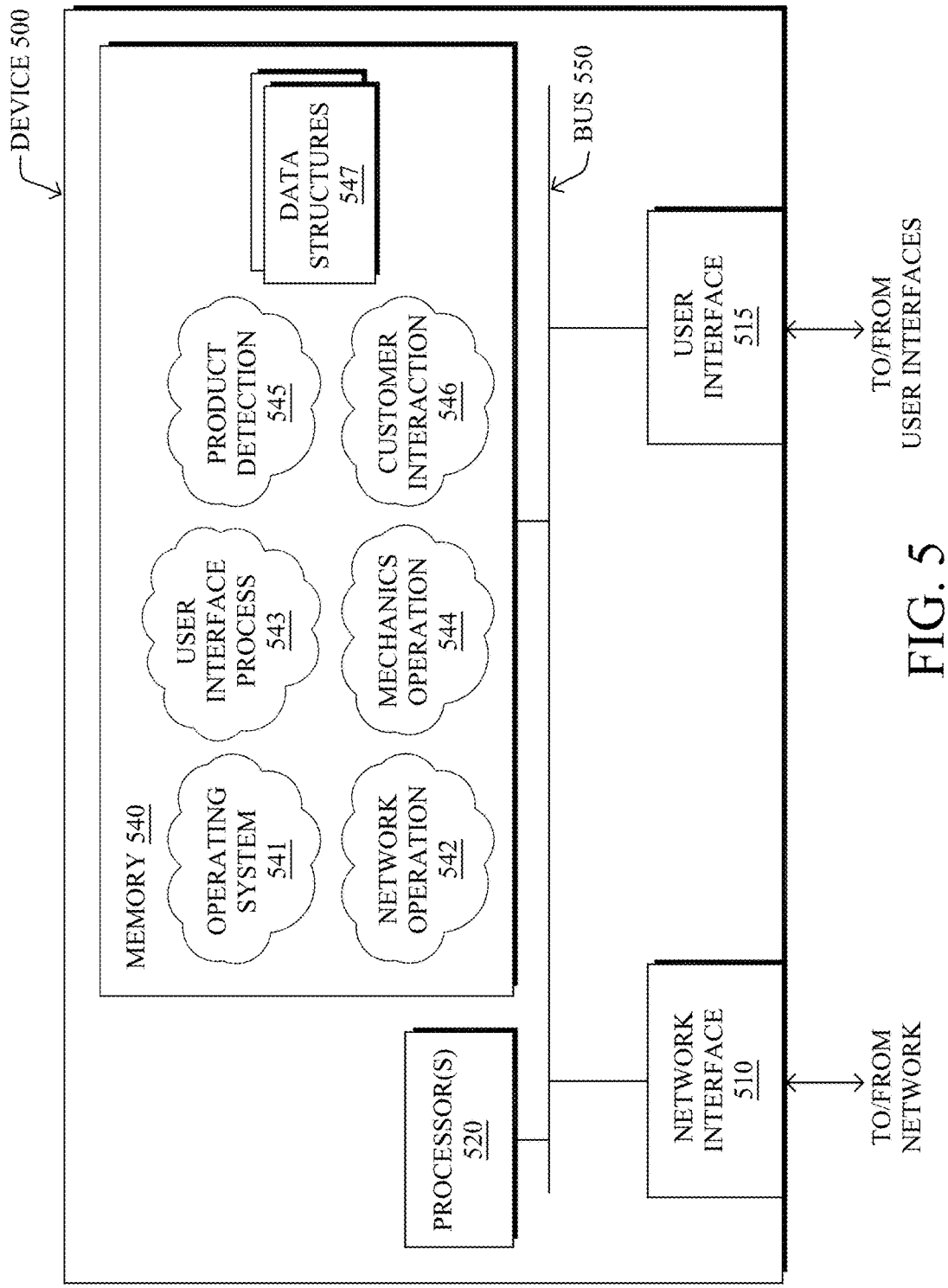
FIG. 5 illustrates an example schematic block diagram of a control system for a mixer for food products in accordance with one or more embodiments herein.

Behind the operation of the mixer 100 is the hardware and software required for operability. In particular, FIG. 5 illustrates an example simplified block diagram of such hardware and software of a control system 500 for a mixer for food products in accordance with one or more embodiments herein. In particular, the system 500 may comprise one or more network interfaces 510 (e.g., wired, wireless, etc.), a user interface 515, at least one processor 520, and a memory 540 interconnected by a system bus 550. The memory 540 comprises a plurality of storage locations that are addressable by the processor 520 for storing software programs and data structures associated with the embodiments described herein. The processor 520 may comprise hardware elements or hardware logic adapted to execute the software programs and manipulate the data structures 547. An operating system 541, portions of which are resident in memory 540 and executed by the processor, may be used to functionally organize the mixer's control system by invoking operations in support of software processes and/or services executing on the system. These software processes and/or services may comprise, illustratively, a network operations process 542, a user interface process 543, a mechanics operation process 544, a product detection process 545, a customer interaction (e.g., point of sale) process 546, etc.

It will be apparent to those skilled in the art that other processor and memory types, including various computer-readable media, may be used to store and execute program instructions pertaining to the techniques described herein. For example, the system 500 may be microprocessor controlled, microcontroller controlled, or other control by embedded systems/processors/etc. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In terms of functionality, the interrelated features of the system 100 herein may be implemented by the processes

542-546, which contain computer executable instructions executed by the processor 520 to perform such functions either singly or in various combinations. For instance, network operations process 542 may allow for communication over network interfaces 510 for various purposes, such as remote system maintenance (e.g., software upgrades, firmware updates, system analytics, etc.), product metric tracking (e.g., quantities purchased, types of products purchased, etc.), social communication (e.g., displayed content/marketing, consumer feedback, etc. via the user interface 130), communication with auxiliary components (e.g., refrigerators and freezers), and so on.

The user interface process 543, in particular, allows for interaction with a consumer through user interface 130 (received internally for processing by user interface 515), whether it be detection of a single "start" button, selection of particular mixing and/or product parameters via a touch screen, or other user interfaces. User interface process 542 may also interact wirelessly (via network interface 510) with a user, such as via apps on a smart device (smartphone, tablet, etc.), for user preference information, customer loyalty coordination, social media connectivity, and so on. As a separate component, or else integrated with user interface 130 and process 543, the customer interaction (e.g., point of sale) process 546 may comprise any necessary programming and authentication processes to interact financially with the customer, such as receiving credit card information through user interface 130 and processing such payment information with a financial server (via network operations process 542), printing receipts, etc.

Mechanics operation process 544 contains computer executable instructions executed by the processor 520 to perform functions related to the mechanical operations of the mixing mechanisms, such as controlling doors, cup covers, specific mixer motions (e.g., directions, duration, frequency, speed, distance, etc.). Specifically, the mechanics operation process 544 may control various actuators and/or motors to direct their functionality as they relate to the system processes as described herein.

Lastly, product detection process 545 may be configured to detect presence of a product. For example, the product detection process 545 may be used to prevent operation of the mixer 100 without a product or without an authorized product. For example, attempting to mix without a product in place may cause damage to certain components expecting the weight/presence of the product, while attempting to mix with unauthorized products (such as misplacing a carbonated drink into the mixer or other unsuitable objects) may also be problematic. Certain sensors may be in place to ensure proper product placement, such as weight, visual, RFID, etc. In addition, in certain embodiments, the product detection process 545 may also be used to detect actual product characteristics, such as weight, temperature, product type/identification, etc., as mentioned above.

Note that while certain processes and functionalities are shown and described herein, any suitable set of control processes may be used in accordance with the techniques herein, and those shown herein are merely one example implementation. Additional or fewer processes may actually be used, whether enabling the same level of functionality or more or less functionality, accordingly.

Figure 6:
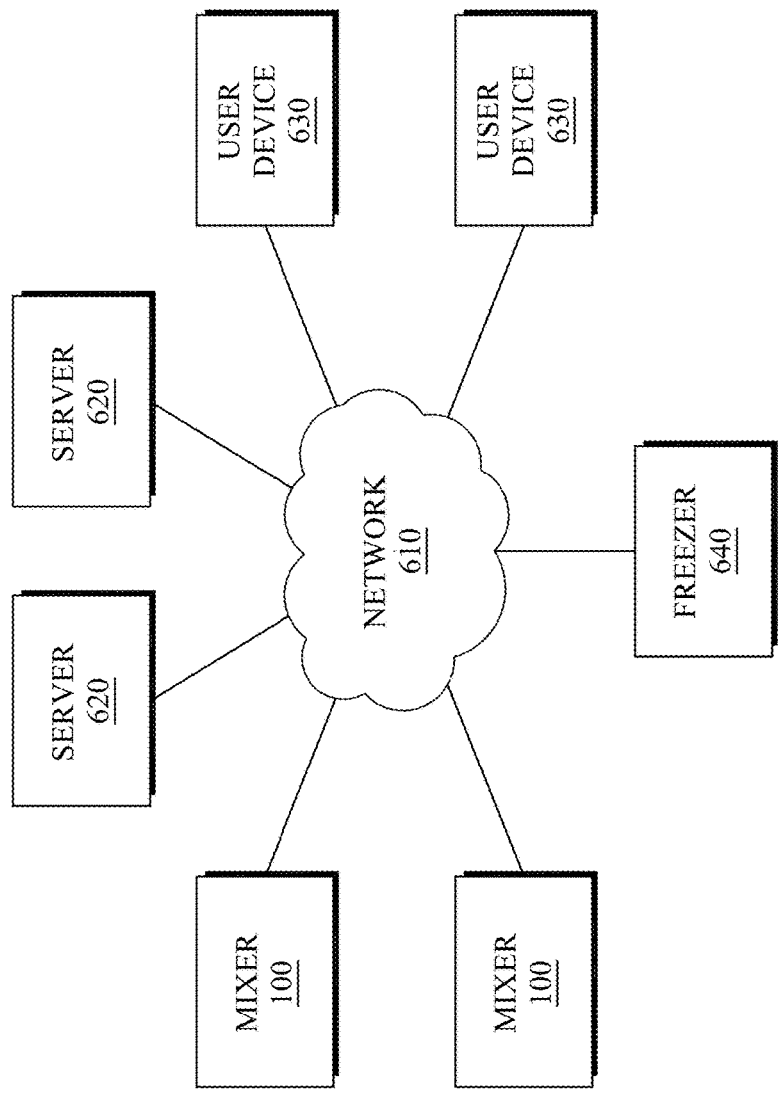
FIG. 6 illustrates an example communication network for use with a mixer for food products in accordance with one or more embodiments herein.

Additionally, FIG. 6 illustrates an example communication network 600 for use with a mixer for food products in accordance with one or more embodiments herein. For instance, one or more mixers 100 may be connected to a network 610 (e.g., wide area network, local area network, cellular network, personal area network, etc.) via the network interface 510 (e.g., wireless/Wi-Fi, wired/tethered, power-line communication, etc.). One or more servers 620 may also be connected to the network 610, and may communicate with the mixer(s) 100 in order to obtain usage data, provide software and/or firmware upgrades, provide media content, etc. In one or more particular embodiments, one or more user devices 630 may also be connected to the network 610 or directly with the mixer 100, capable of communicating directly with the mixer(s) 100 or else with the server(s) 620 for various user communications as mentioned above (e.g., social media, mixer control, etc.).

In addition, in certain embodiments, one or more freezers, coolers, and/or refrigerators 640 may also be networked within the communication network 600. For instance, the device(s) 640 may be in local communication with an associated mixer 100, or else via individual communication with the network 610 (e.g., to servers 620). Connected devices 640 allow for the monitoring and feedback control of temperatures, detection of product inventory, etc. In general, the devices 640 may be purpose-built in association with the mixers 100 (e.g., manufacturer-specific and designed for such monitoring and communication), or else may simply be standard devices with added capability components (e.g., stand-alone sensors inserted into the devices, etc.).

In accordance with one or more embodiments of the present invention, a specific mixing technique may be used as the mixing mechanism for the mixer 100 described above. That is, as mentioned above, the mixer 100 mixes a food product (e.g., mostly frozen) to a desired consistency without opening a sealed product cup 300 and without the use mixing blades, agitators, paddles, etc. being inserted into the food product. Specifically, the mixer 100 uses increased force created by controlled movement of the product cup 300 in order to mix the food product, where internal mixing occurs completely inside of the sealed product cup 300.

In particular, FIG. 7 illustrates an example of dual-axis mixing according to one or more embodiments of the present invention. The core of the dual-axis mixing mechanism illustrated in FIG. 7 includes a main or "primary" axis 710 ("#1"), which increases the gravitational force on the product cup 300, and a secondary axis 720 ("#2"), which does the product mixing within the cup. For instance, for many food products, and particularly semi-solid ice cream food products (e.g., that start like soft-serve), simply turning the cup 300 won't mix the product within itself. However, applying/increasing the centripetal/gravitational force to the product (i.e., rotating the primary axis 710) in combination with rotating/spinning the product cup 300 about the secondary axis 720 forces a sufficient mixing action, since the centripetal force moves the product sufficiently.

Said differently, unlike simple centrifuges (which are used to separate materials out of a liquid suspension), the dual-axis mixing technique uses a centrifugal force created about the primary axis 710 to increase "gravity" (centripetal force) on the product (e.g., milkshake) within the product cup 300 in order to force thick material to flow, so that the secondary spin about the secondary axis 720 produces a churning inside the cup 300. Without the increased gravity, the material would just rotate with the cup and not churn inside.

Figure 8B:
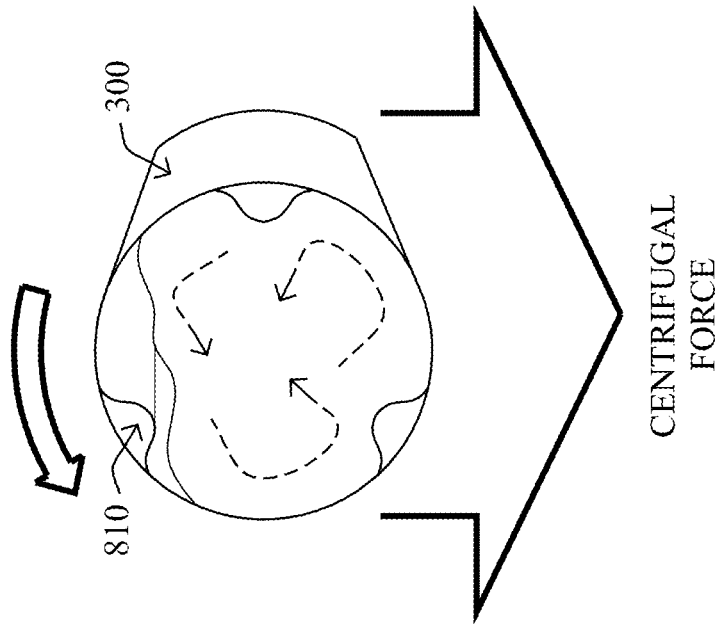
FIGS. 8A and 8B illustrate examples of food product mixing within a mixing cup (without internal blades and with internal blades) in accordance with one or more embodiments herein.
Figure 8A:
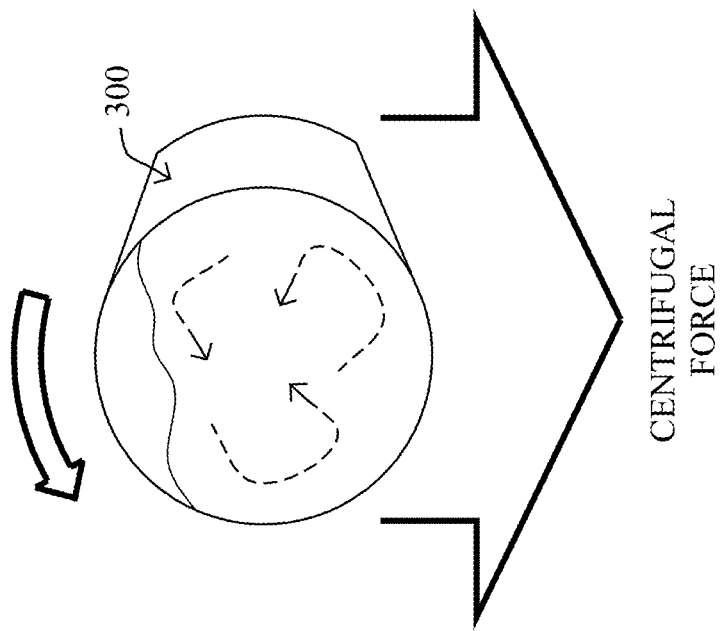

Examples of food product mixing within a mixing cup 300 are shown in FIGS. 8A and 8B. For instance, FIG. 8A illustrates an example of the mixing within the cup 300 without any internal agitation components (e.g., blades), showing the general mixing of the product. Conversely, FIG. 8B illustrates the installation of mixing paddles or blades 810 inside the cup for mixing and the associated mixing pattern. In general, it has been found through experimentation that the blades 810 are not necessary for adequate mixing, but there may be instances where they are beneficial, and are thus shown herein as being specifically contemplated.

Figure 9:
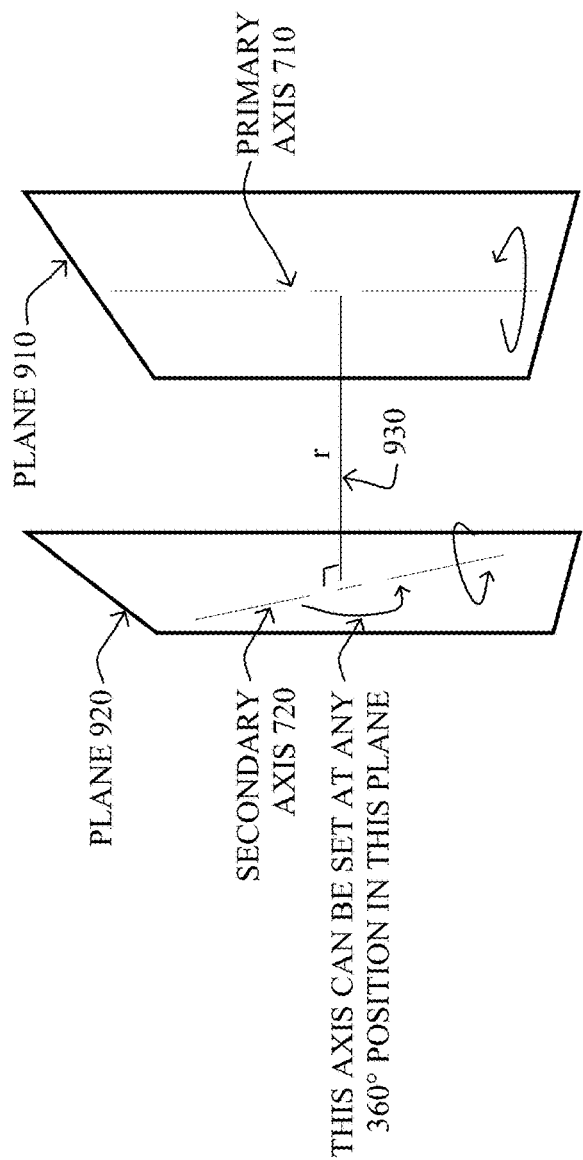
FIG. 9 illustrates an example of angular relation of dual-axis mixing in accordance with one or more embodiments herein.

Regarding the angular relation of the primary axis 710 and secondary axis 720, it has generally been determined, and illustrated in FIG. 9, that the product cup 300 can be in any orientation that has the secondary axis 720 in a plane 920 that is parallel to a plane 910 that contains the primary axis 710. To state that another way, the secondary axis 720 is preferably perpendicular to a line 930 of the radius ("r") from the primary axis 710.

Additionally, in certain configurations, such as if the two axes are set more toward being parallel to each other (such as shown below in FIGS. 10A-10B), it is preferred for optimal mixing that the primary and secondary axis spin in opposite directions (counter-rotation). For instance, if the primary axis is spinning clockwise, the secondary axis should spin counter-clockwise, as spinning both in the same direction (when nearly parallel) does not produce optimal mixing characteristics.

Figure 10A:
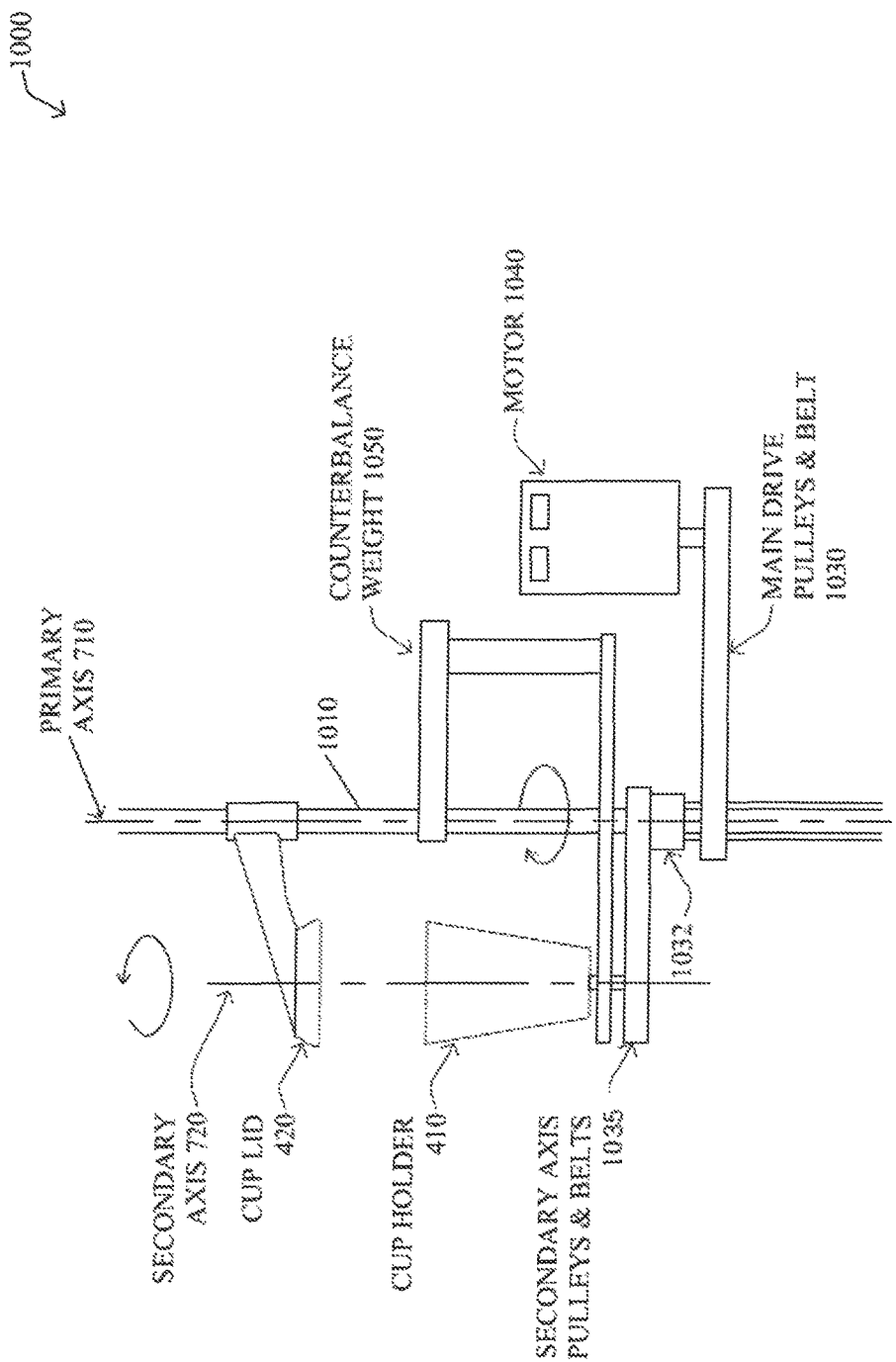
FIGS. 10A and 10B illustrate an example implementation of a dual-axis food product mixer (open and closed position) in accordance with one or more embodiments herein.
Figure 10B:
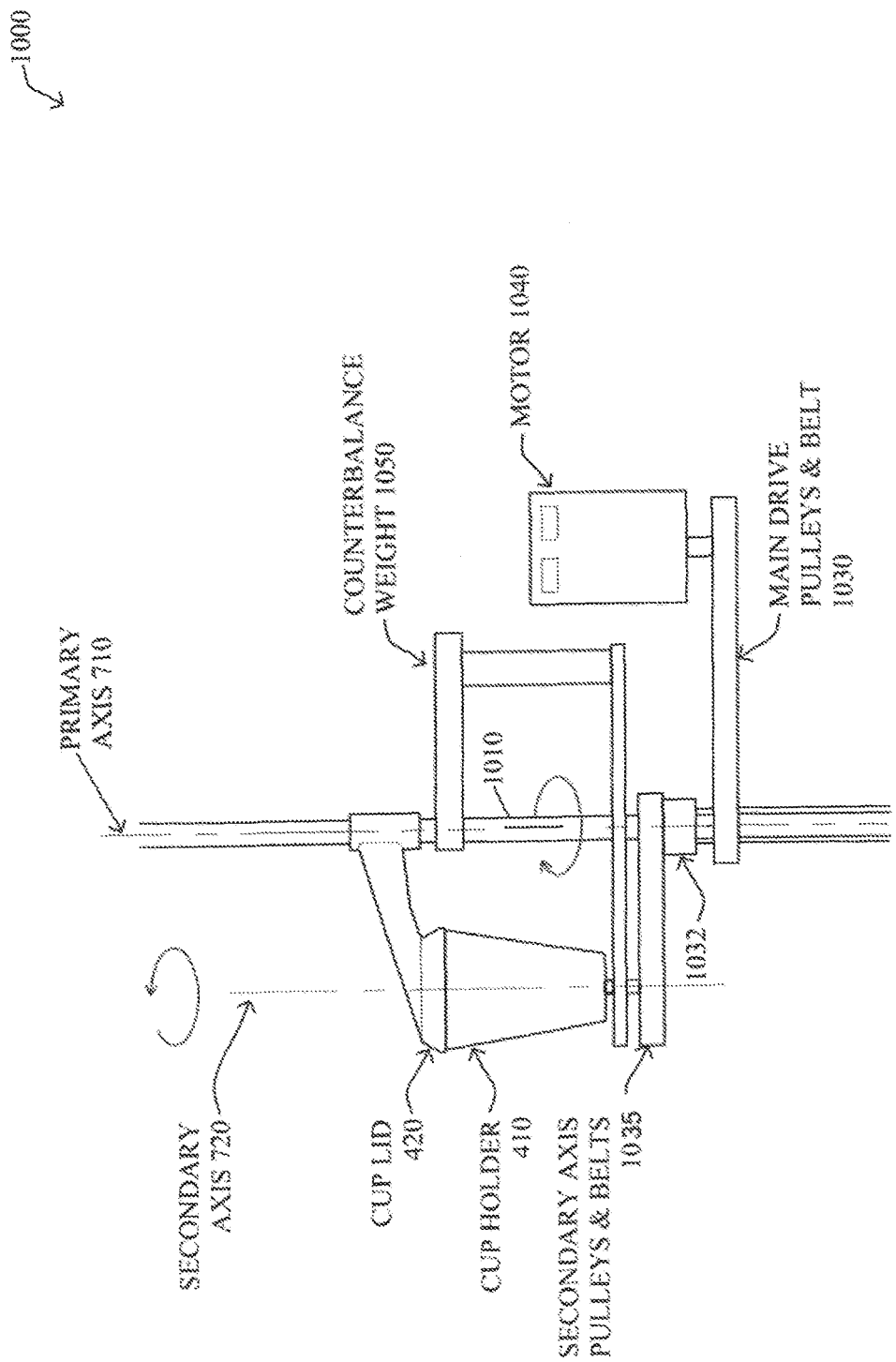

FIGS. 10A and 10B illustrate an example implementation of a dual-axis food product mixer 100 (e.g., in the open and closed position, respectively) in accordance with one or more embodiments herein. In particular, the mixing mechanism 1000 may specifically comprise the cup holder 410 and cup cover/lid 420 as described above, which are configured to rotate about the secondary axis 720, while the entire mechanism 1000 rotates about the primary axis 710. A counterbalance weight (or counterweight) 1050 may also be used to balance the high-speed rotation of the system, and to thus prevent problematic vibrations.

Illustratively, the primary axis is defined by a central support shaft 1010, about which the assembly rotates. Note that although the shaft 1010 may be configured to rotate, a preferred design as shown in FIGS. 10A and 10B fixes the center shaft (primary axis) in position so that it does not rotate, and thus the mechanism 1000 may be mounted on bearings around this fixed shaft. In this manner, in one embodiment, a pulley 1032, driven by belt or gears 1030, can be used to drive the cup holder 410 about the secondary axis 720 via secondary pulley 1035. For example, the center pulley 1032 will cause the cup holder to spin around the secondary axis by driving the secondary pulley 1035, accordingly. That is, by driving the mixing mechanism 1000 with the motor 1040, the secondary axis spins automatically.

Figure 11A:
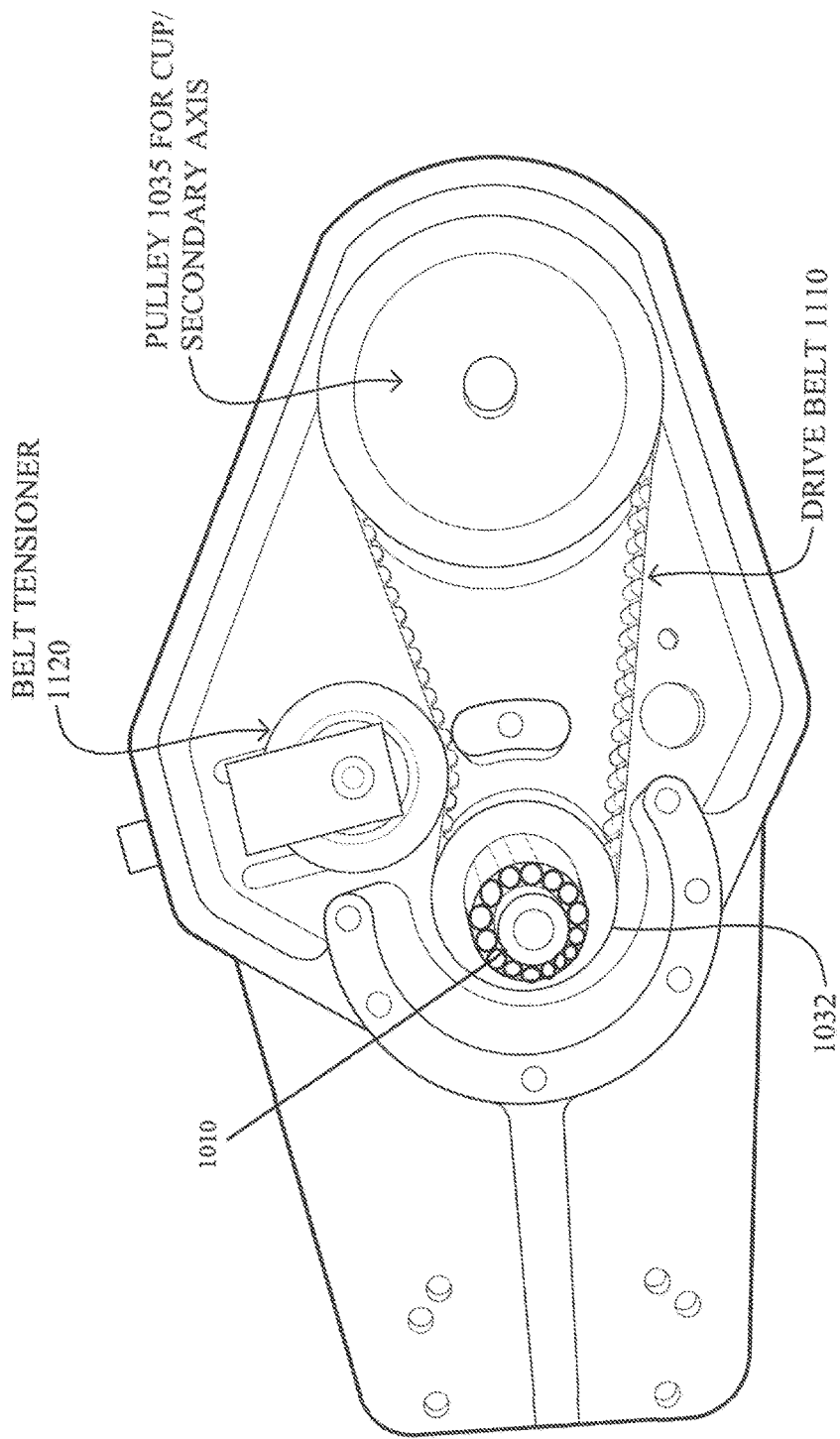
FIGS. 11A and 11B illustrate example gearing of a dual-axis mixer in accordance with one or more embodiments herein.
Figure 11B:
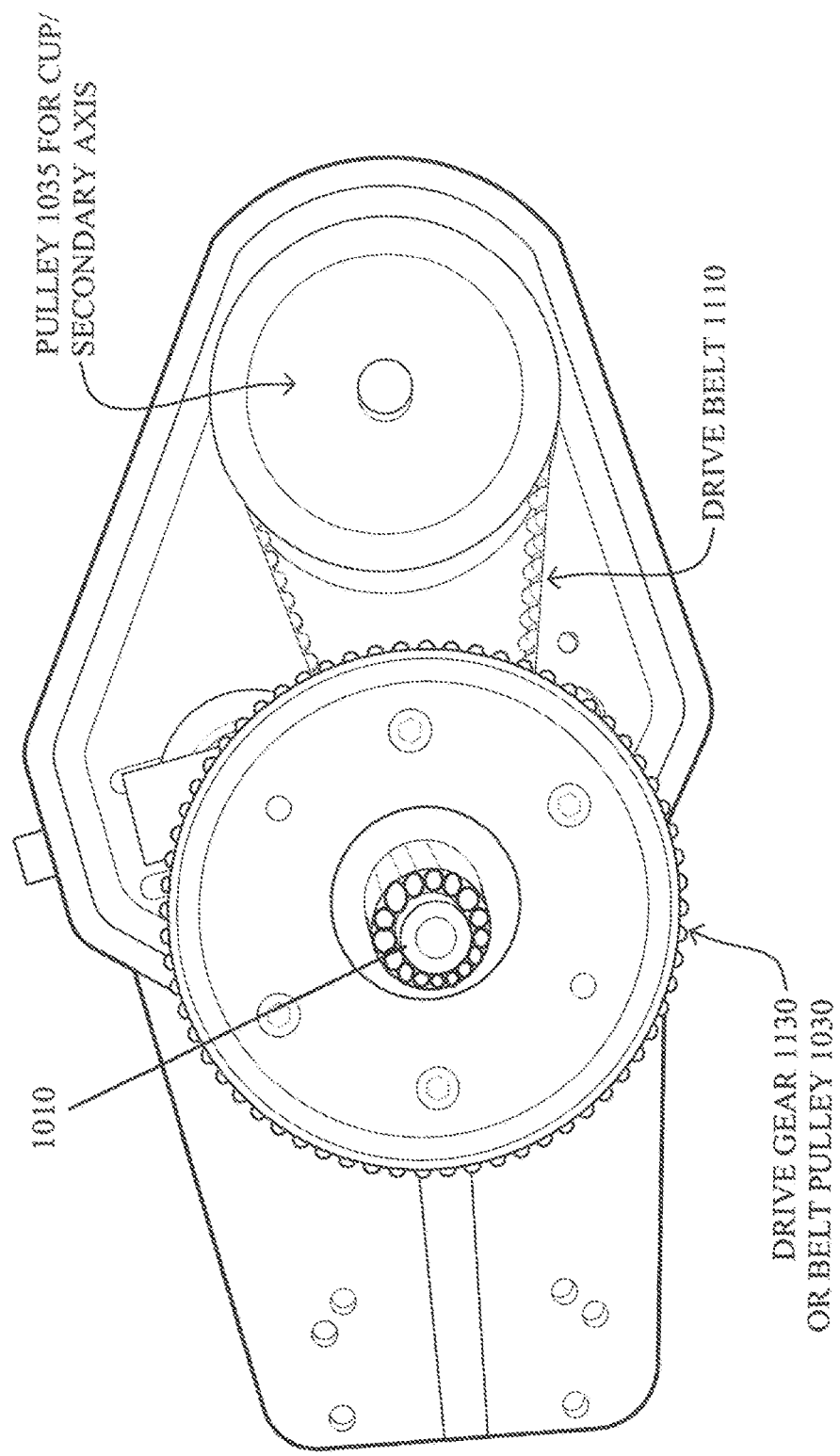

FIGS. 11A and 11B illustrate example gearing of a dual-axis mixer in accordance with one or more embodiments herein, to provide a clearer view of an illustrative geared/pulley system that can drive the mixing mechanism 1000. In particular, as shown in FIG. 11A, the pulley 1032 is shown driving a belt drive 1110 to correspondingly drive the secondary pulley 1035. (Note that a belt tensioner 1120 may also be used, as will be appreciated by those skilled in the art.) In this manner, when the mixing mechanism is driven in a first direction (e.g., clockwise about the primary axis), then the product cup on the secondary axis will spin in the opposite direction (e.g., counter-clockwise about the secondary axis). Note that while a belt drive is shown to drive the secondary axis off of the primary axis, it could also be a gearbox or other mechanism. As shown in FIG. 11B, to drive the mixing mechanism 1000, a motor (e.g., 1040) may drive a pulley 1030 or gear 1130 that is fixed to the mechanism 1000, thus turning the entire mechanism about the primary axis 710 (e.g., fixed shaft 1010), where the associated pulley 1032 remains stationary relative to the mixer 100, but rotating relative to the mechanism 1000, thus driving the secondary pulley 1035 and thus cup holder 410 and product cup 300, accordingly.

Note that while the embodiments shown above illustrate a system where the primary axis and secondary axis are driven off the same motor, independent motors may also be used to drive each axis, respectively.

Figure 12B:
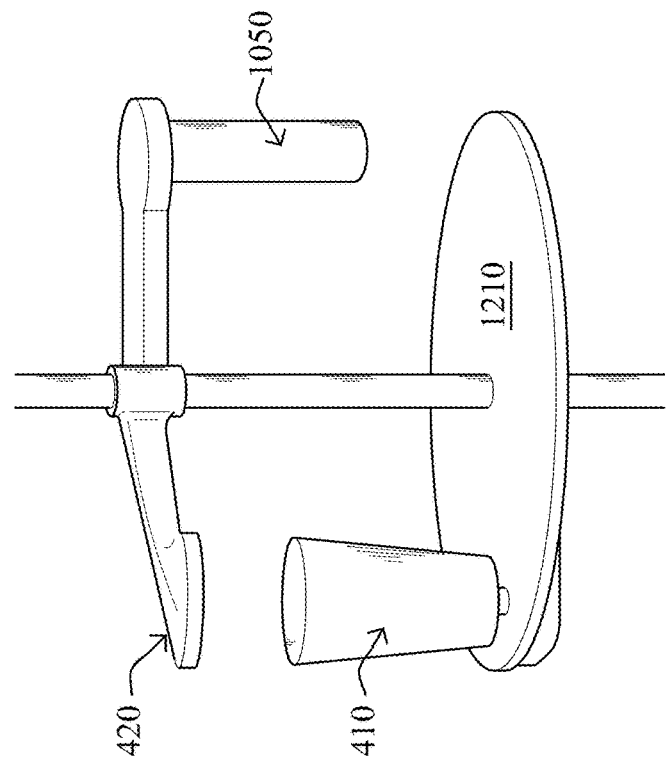
FIGS. 12A and 12B illustrate examples of counterweights used in a dual-axis mixer (bottom and top locations) in accordance with one or more embodiments herein.
Figure 12A:
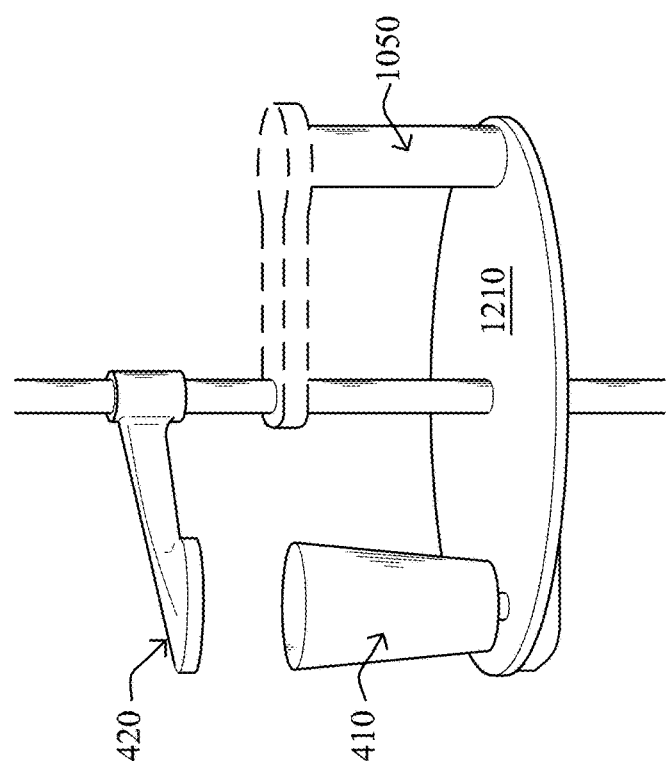

Additionally, FIGS. 12A and 12B illustrate examples of counterweights 1050 used in a dual-axis mixer in accordance with one or more embodiments herein. In particular, as mentioned above, a counterbalance weight 1050 may be used to balance the spinning system. In one embodiment, as shown in FIG. 12A, a floor 1210 is added to introduce the concept of covering up various the mechanical components, and as such, the counterweight 1050 may be attached to the floor 1210 (e.g., and optionally the shaft, as shown in shadowed lines). Alternatively, as shown in FIG. 12B, the counterweight 1050 may be attached to the product holder cap 420 (or other mechanism), such that when the system is closed and cup holder 410 is sealed, the counterweight 1050 is correspondingly moved into place. Note that the counterweight 1050 can be located anywhere to balance the mixing system (e.g., attached to the bottom, top, basin, shafts, holders, etc.). Note further that other variations do not require a specific counterbalance weight, such as where the system is inherently balanced, that is, without a "defined" counterbalance weight 1050 (e.g., by mechanically configuring the mass of the rotating mixing mechanism to balance it out when a product cup 300 is inserted). Those skilled in the art will also appreciate that while it is advisable to balance a rotating system, whether with a specific counterbalancing weight or with adequate mass distribution, establishing a balanced system is merely preferable, and is not meant to be limiting the scope of the invention described herein.

The effectiveness of the product mixing using mixing mechanism 1000 in mixer 100 is based on a variety of configured and/or adjustable parameters, such as rotation speed of the primary and secondary axes, as well as the distance of the product cup from the primary axis. Also, the effects of one parameter may require changes to one or more other parameters.

As one example, the distance between the center/primary axis 710 and the product cup 300 (e.g., outer/secondary axis 720), thus the "product cup offset", can be chosen based on the desired outcome when used with particular axis speeds, or vice versa. For instance, depending on the thickness of the food product (e.g., milkshake) for which the machine is designed, the primary axis rotation speed may need to be faster or slower to produce a desired centripetal force. The same holds true for the secondary axis rotation speed to produce a desired mixing flow/churn within the product cup. To add more complexity to the equation, the ratio between the primary axis rotation speed and the secondary axis rotation speed also plays a factor in proper mixing.

Experimentally, the secondary axis was fixedly geared to drive at half the speed of the primary axis speed, though any ratio may be created as either a fixed or adjustable ratio. Assuming this ratio, however, for a range of currently available milkshake product thicknesses and general viscosities, a range of 400-1000 rpm was determined to be a good speed for the primary axis (e.g., 700 rpm), thus corresponding to a secondary axis speed of 200-500 rpm (e.g., 350 rpm).

To come to these ranges, product cup offsets up to 160 mm were tested with positive results (conceivably producing positive results at any offset greater than this). By testing down to 60 mm, positive results were also obtained for mixing the milkshake, however below ~80-100 mm offset the solid mix-ins (e.g., candies, cookies, etc.) started being too strongly influenced by the centrifugal force and started to be forced to the walls of the product cup. Furthermore, when testing to the smaller offsets, the primary speed would have to be increased so as to keep the centrifugal force the same at the center of the cup, e.g., at 120 mm offset, a suitable primary axis speed would be 700 rpm, while at 60 mm offset, the primary axis speed would need to be approximately 1000 rpm.

Based on these experiments, a product cup offset for good mixing was between 40 mm and 300 mm (depending on whether there were solid mix-ins), and more preferably between 100 mm and 160 mm (e.g., 120 mm), though any suitable offset may be used so long as adequate mixing is provided without separating out solids or otherwise creating an undesired consistency of the final product.

Another factor to consider is the duration of the mixing. In general, there is a lower limit to the mixing time required to adequately mix the food product and to create the desired consistency, as well as an upper limit to the time to prevent over-mixing and producing a diminished consistency. (User perception of the wait time is also an important factor in the duration of the mixing.) Through the experimentation above, suitable mixing may occur between 10 and 45 seconds, preferably after about 20-30 seconds of mixing.

Figure 13A:
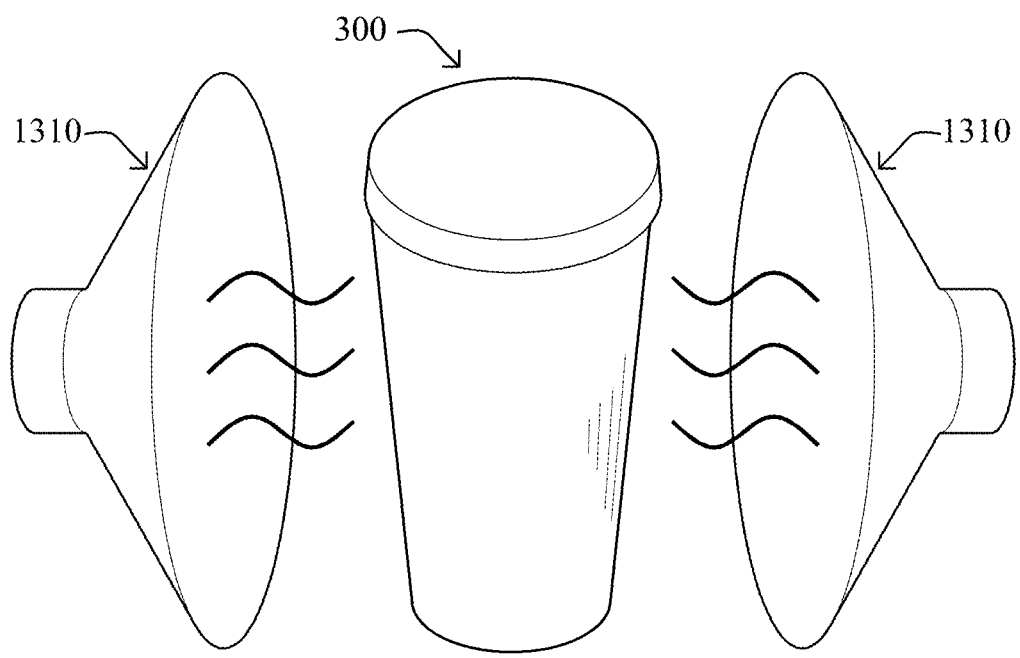
FIGS. 13A and 13B illustrate examples of food product heating (system and cup-specific) in accordance with one or more embodiments herein.
Figure 13B:
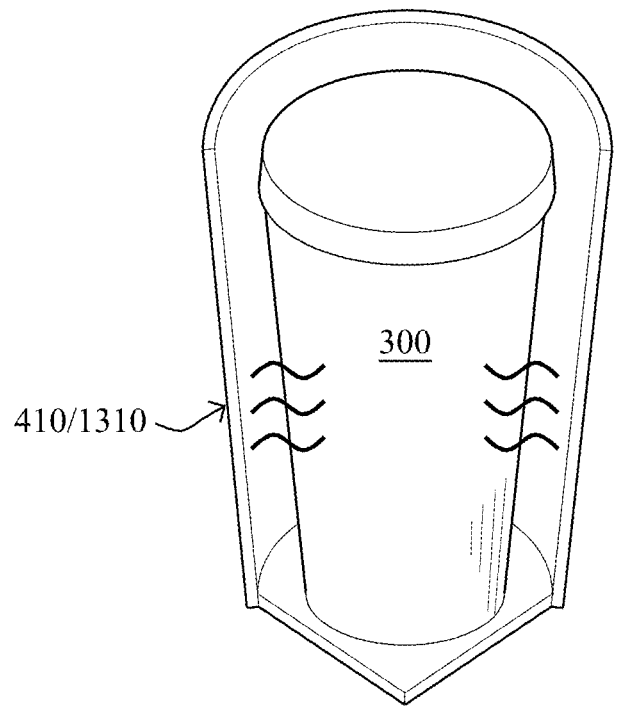

Note that in one or more embodiments herein, it may be optional to provide heat to the product cup 300 during the mixing described above. Generally, it has been determined that external heating is not required in the mix time allotted, and all observed increases in temperature in the product is due to the physical act of mixing (physical movement at the molecular level). Also, when there is no an ambient air heating, the techniques herein are able to close off the cup holder 410 with cap 420 to help avoid catastrophic spills inside the machine during mixing. At the same time, however, it may be possible and desirable to provide heat to the product, and as such, FIGS. 13A and 13B illustrate examples of food product heating in accordance with one or more embodiments herein. For instance, in FIG. 13A, heat may be supplied by one or more heat sources 1310, such as heating lamps, coils, microwaves, etc., located external to the product cup 300, particularly external to any holding cup 410 used to contain the product cup. Since embodiments where the holding cup is generally designed to contain any accidental spills (as opposed to, say, a wire cage or other air/heat permeable holder), FIG. 13B illustrates an alternative embodiment where the heat source 1310 may be located as part of the holding cup 410 (e.g., and/or cover 420).

Figure 14:
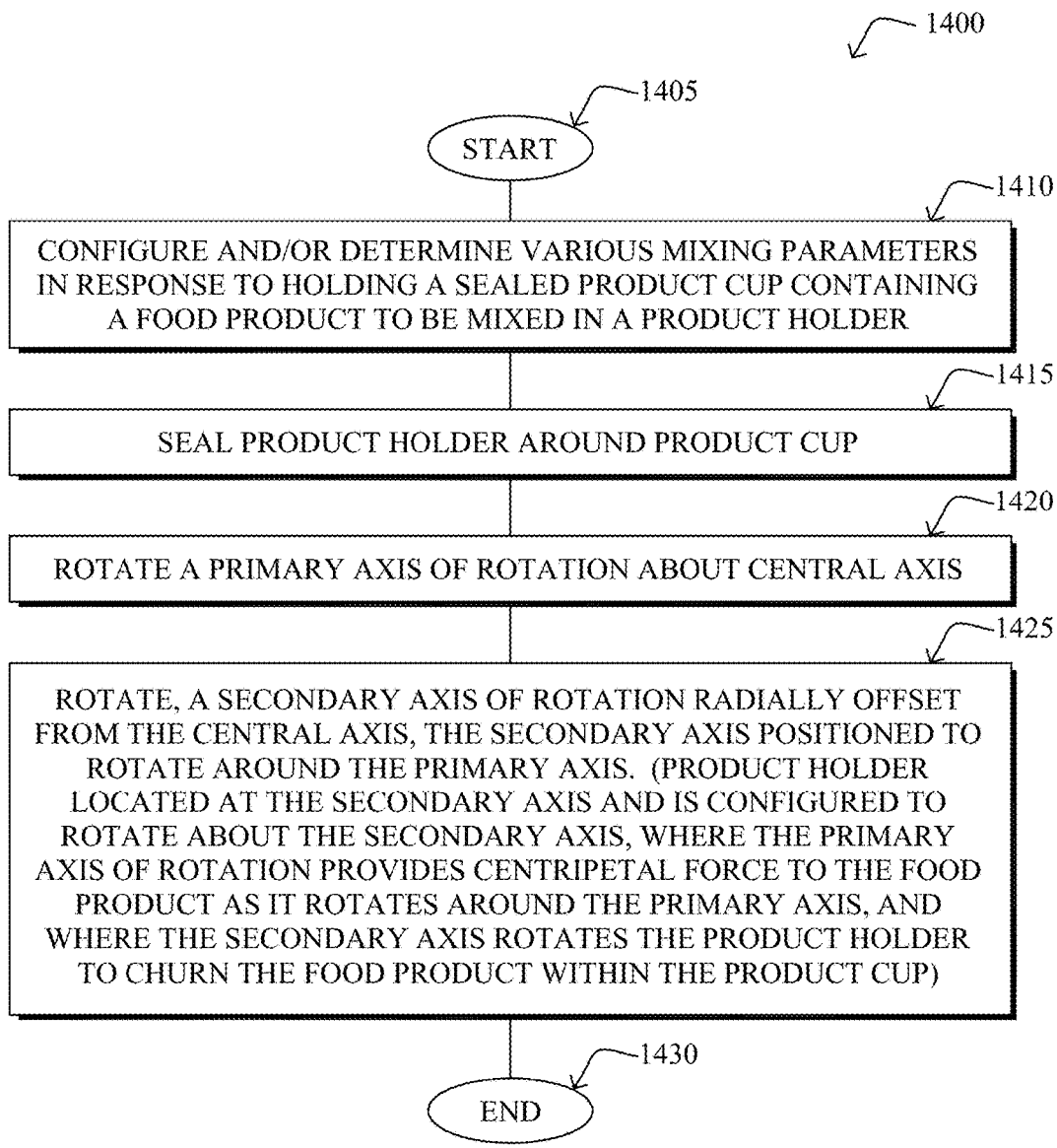
FIG. 14 illustrates an example simplified procedure for dual-axis mixing of food products in accordance with one or more embodiments herein.

FIG. 14 illustrates an example simplified procedure for dual-axis mixing of food products in accordance with one or more embodiments herein. The procedure 1400 may start at step 1405, and continues to step 1410, where various mixing parameters are configured and/or determined (e.g., speed, duration, etc.) in response to holding a sealed product cup containing a food product to be mixed in a product holder. In step 1415, the product holder may be sealed around the product cup. Then, in step 1420, a primary axis of rotation is rotated (driven) about a central axis, and in step 1425 a secondary axis of rotation radially offset from the central axis is rotated, the secondary axis positioned to rotate around the primary axis. Notably, as described above, in one embodiment driving the primary axis correspondingly drives the secondary axis. According to the techniques herein, as described in greater detail above, the product holder is located at the secondary axis and is configured to rotate about the secondary axis, where the primary axis of rotation provides centripetal force to the food product as it rotates around the primary axis, and where the secondary axis rotates the product holder to churn the food product within the product cup. The simplified procedure 1400 then ends in step 1430, notably after providing access to the mixed food product.

It should be noted that while certain steps within procedures 200 and 1400 may be optional as described above, the steps shown in FIGS. 2 and 14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 200 and 1400 are described separately, certain steps from each procedure may be incorporated into each other procedure, and the procedures are not meant to be mutually exclusive.

Notably, the embodiments described herein may be applied to any suitable food product, and particularly to any type of ice cream used to make a milkshake, malt, or other ice cream beverages. In particular, the operating ranges of the mixing mechanics described in the embodiment above herein may generally be applicable to any formula of ice cream, including any set of ingredients, a wide range of product temperatures, and so on. That is, the dimensions of the product, the relative orientations, the speeds or frequencies of the mixing, the duration of the mixing, etc. can be set to a general configuration to handle many variations in product characteristics, or else may be adjusted manually or in response to one or more product characterizations.

In addition, the specific placement of components in relation to each other, particularly driving motors, can be anywhere that is suitable for various design considerations within the mixer 100. Also, where any gears, drive belts, or chains are specifically mentioned above, such driving mechanisms may be interchanged.

Figure 15A:
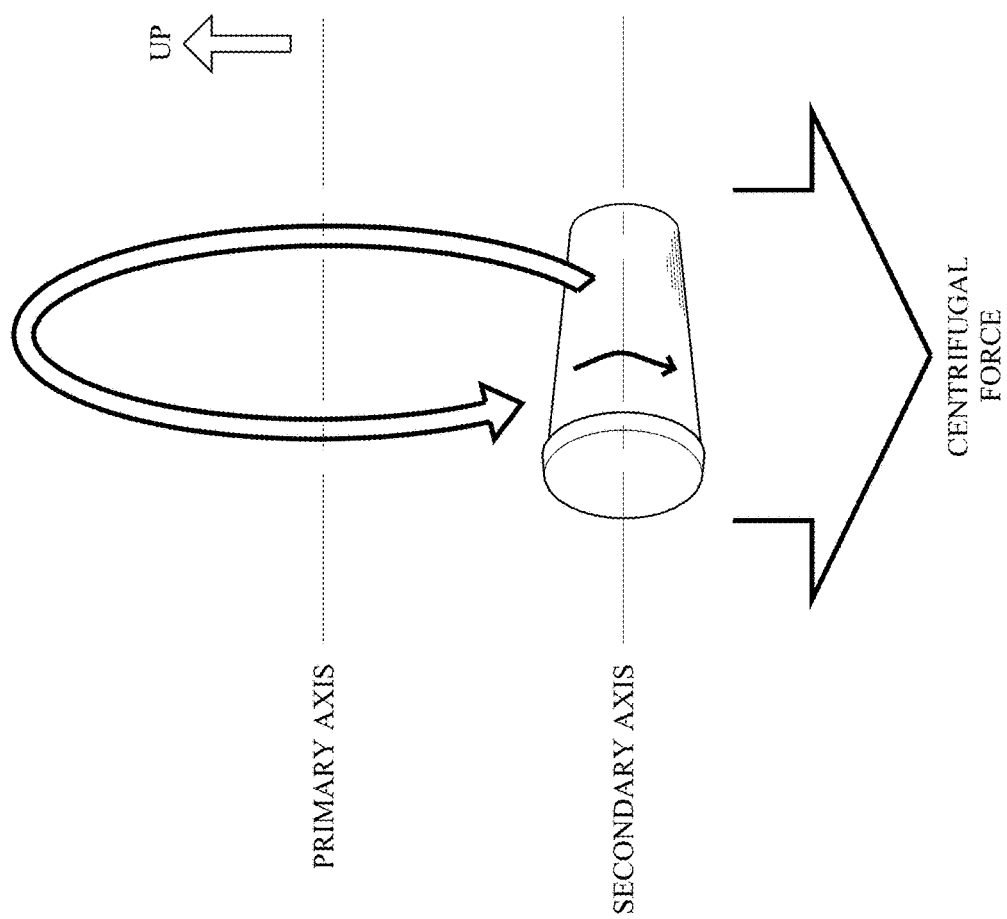

Other alternative orientations of the mixer 100 may also be contemplated with substantially similar results to those orientations shown and described above, where various mechanisms can be mounted in any orientation that is advantageous to loading the product cup 300 or to machine layout and/or performance. For instance, FIGS. 15A and 15B illustrate examples of alternative orientations of a dual-axis food product mixer in accordance with one or more embodiments herein. For example, as shown in FIG. 15A, the parallel-axis system described above can be placed at any angle, including being completely vertical, as shown. FIG. 15B, on the other hand, shows an instance where the secondary axis is not parallel to the primary axis, but where the second axis is still within a plane that is perpendicular to the radius of the primary.

The systems and techniques described in detail above thus provide for an advanced automated food product mixer. In particular, the techniques herein offer an enhanced consumer experience, being simple to use and effective in producing an optimal consumable product, particularly in terms of product consistency. The system herein also has provisions for cleanliness that are not available in current systems, improving both sanitary conditions of the system as well as eliminating cross-contamination of products, each being especially beneficial for systems where multiple consumers use the machine without server intervention, such as when placed in convenience stores or self-serve stations at restaurants.

While there have been shown and described illustrative embodiments, it is to be understood that various other adaptations and modifications may be made within the spirit and scope of the embodiments herein, regardless of whether they were specifically mentioned herein. For instance, certain techniques or features that are currently understood in the art may be viable alterations to the examples described above (e.g., in terms of both the food product itself as well as mechanical or electrical components of the automated machinery).

In addition, while the system and techniques above have been generally described in terms of food products relating to milkshakes, malts, or other ice cream beverages, other food products (solid, semi-solid, liquid, frozen, thawed, semi-frozen, etc.) may take advantage of the techniques above, where applicable. Accordingly, the present invention, though preferably directed toward milkshakes, malts, or other ice cream-like beverages, is not intended to be limited as such.

Furthermore, it is also expressly contemplated that certain components and/or elements described herein can be implemented as software being stored on a tangible (non-transitory) computer-readable medium (e.g., disks, CDs, RAM, EEPROM, etc.) having program instructions executing on a computer, hardware, firmware, or a combination thereof.

Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A dual-axis self-serve frozen food product mixer, comprising:
    a mixing chamber adapted to receive within the mixing chamber a previously sealed product cup containing a frozen food product to be mixed;
    a product holder disposed within the mixing chamber and configured to hold the previously sealed product cup and seal around the previously sealed product cup to form a double seal, the product holder including:
        a cup lid movable along a fixed shaft defining a primary axis, and
        a cup holder adapted to receive the previously sealed product cup, wherein the cup lid is movable along the fixed shaft to come in cooperation with the cup holder and form the double seal; and
    a mechanism configured to rotate the product holder about the primary axis;
    wherein the product holder is configured to rotate the cup holder and the sealed product cup about a secondary axis of rotation that is radially offset from the primary axis while the cup holder and the sealed product cup are rotated about the primary axis.

2. The mixer as in claim 1, wherein the food product is an ice cream product.

3. The mixer as in claim 1, wherein the sealed product cup comprises internal agitation components.

4. The mixer as in claim 1, further comprising:
    a heat source associated with the mixing chamber to provide heat to the food product.

5. The mixer as in claim 1, wherein a speed of rotation for one or both of product holder and the cup holder is adjustable.

6. The mixer as in claim 1, further comprising:
    a door to provide access to the mixing chamber.

7. The mixer as in claim 1, wherein the secondary axis is in a plane that is parallel to a plane of the primary axis.

8. The mixer as in claim 1, wherein the product holder and the cup holder are counter-rotating.

9. The mixer as in claim 1, further comprising:
    a counterbalancing weight attached to the product holder.

10. The mixer as in claim 1, wherein the primary axis is located along the fixed shaft.

11. The mixer as in claim 1, wherein the mechanism configured to rotate the product holder about the primary axis includes:
    a motor configured to drive the rotation of product holder and the cup holder via one or more pulley mechanisms.

12. The mixer as in claim 1, wherein the mechanism configured to rotate the product holder about the primary axis includes:
    a motor configured to drive the rotation of the product holder.

13. A dual-axis mixer for food products, comprising:
    a mixing chamber adapted to receive within the mixing chamber a previously sealed product cup containing a frozen food product to be mixed;
    a product holder disposed within the mixing chamber and configured to hold the previously sealed product cup and seal around the previously sealed product cup to form a double seal, the product holder including:
        a cup lid movable along a fixed shaft defining a primary axis, and
        a cup holder adapted to receive the previously sealed product cup, wherein the cup lid is movable along the fixed shaft to come in cooperation with the cup holder and form the double seal;
    the mixer further defining a secondary axis of rotation radially offset from the primary axis, the secondary axis positioned to rotate about the primary axis; and
    a processor configured to execute a control process configured to control the mixer to mix the food product,
        wherein the cup holder is located at the secondary axis and is configured to rotate about the secondary axis,
        wherein the product holder provides centripetal force to the food product as the product holder rotates around the primary axis, and
        wherein the cup holder rotates the sealed product cup to churn the food product within the sealed product cup.

14. The mixer as in claim 13, wherein the food product is an ice cream product.

15. The mixer as in claim 13, further comprising:
    a user interface in communication with the processor.

* * * * *